United States Patent [19]

Ou

[11] Patent Number: 5,177,824
[45] Date of Patent: Jan. 12, 1993

[54] METHOD OF MAKING EVA SHOE MIDSOLE

[76] Inventor: Yang-Chiu Ou, No. 231, Cheng Kung 3rd Road, Nantou City, Taiwan

[21] Appl. No.: 805,750

[22] Filed: Dec. 12, 1991

[30] Foreign Application Priority Data

Aug. 20, 1991 [CN] China .................... 91105914.8

[51] Int. Cl.$^5$ ................ A43D 13/04; B29D 27/00
[52] U.S. Cl. .................. 12/146 BR; 36/32 R; 12/146 B; 264/55; 264/45.3
[58] Field of Search ........ 12/146 B, 146 BR, 146 BP; 36/30 R, 30 A, 14, 32 R; 264/55, 51, 45.3, 244

[56] References Cited

U.S. PATENT DOCUMENTS

| | | | |
|---|---|---|---|
| 4,159,294 | 6/1979 | Oishi et al. | 264/45.3 |
| 4,314,954 | 2/1982 | Ringdal | 264/55 X |
| 4,559,190 | 12/1985 | Quintavelle et al. | 264/45.3 |
| 4,627,178 | 12/1986 | Sullivan et al. | 12/146 BR X |
| 4,694,589 | 9/1987 | Sullivan et al. | 12/146 BR X |
| 4,877,814 | 10/1989 | Ito | 264/45.3 X |
| 4,919,866 | 4/1990 | Kubbutat | 264/45.3 |

*Primary Examiner*—Paul T. Sewell
*Assistant Examiner*—Ted Kavanaugh

[57] ABSTRACT

A method of making EVA shoe midsole includes a compound containing in percentage by weight the substances such as 100% of ethylene vinyl acetate (EVA) into which 5–40% of filling agent, 1–10% of foaming agent, 0.5–3% of bridging agent, 0.5–5% of finishing aid, 0.1–1% of foaming aid and coloring agent are added. Such compound is made into particles to be injected into the primary mold in which the preliminary blank of midsole is formed. The preliminary blank is made to foam to take shape of a molded blank under heat and pressure so as to ensure that the size of the molded blank corresponds to that of the midsole intended to be made. The molded blank is then treated in the secondary mold under heat and pressure and is subsequently cooled to take form of the midsole intended to be manufactured.

6 Claims, 5 Drawing Sheets

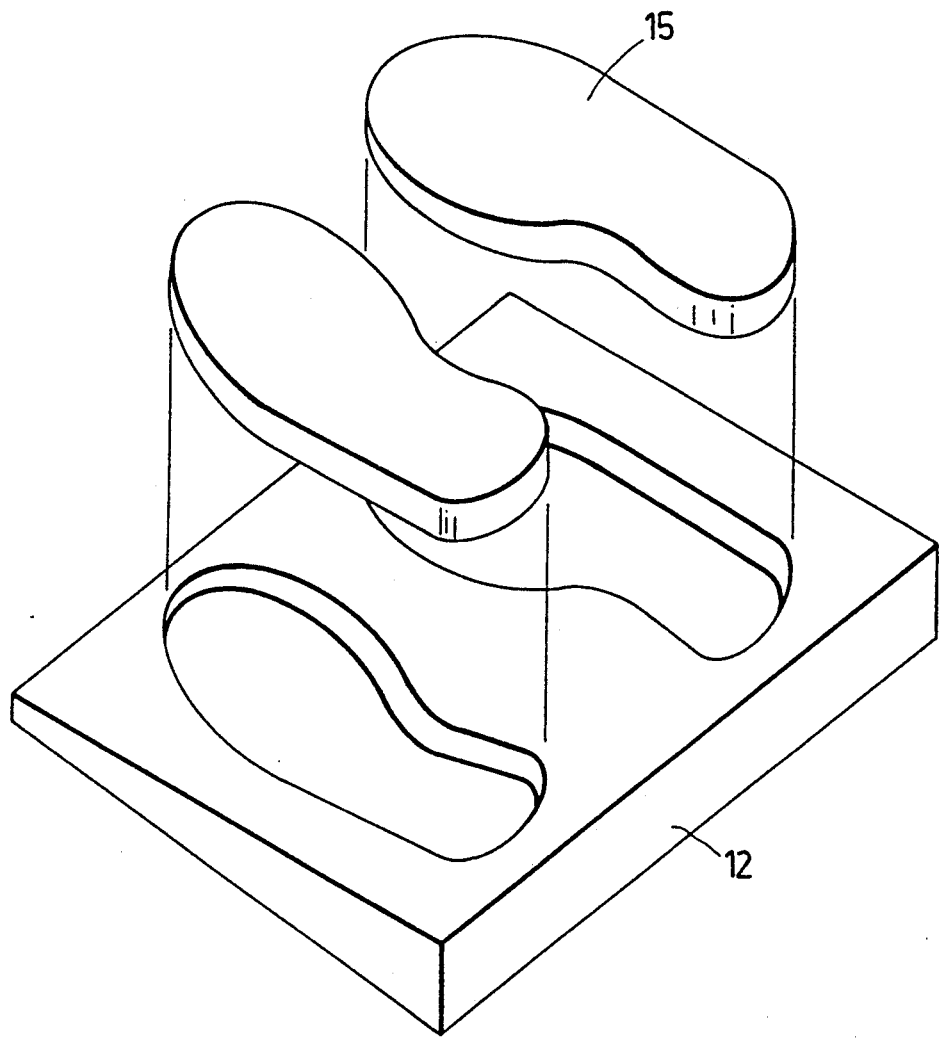
FIG. 5
PRIOR ART
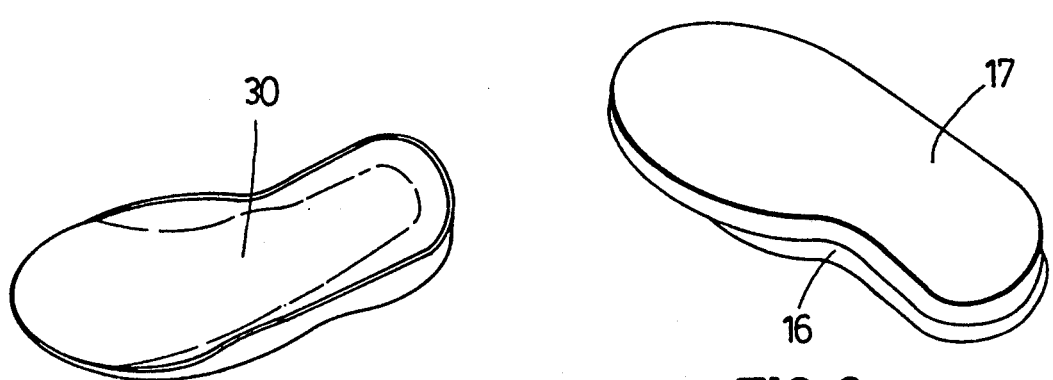
FIG. 7
PRIOR ART
FIG. 6
PRIOR ART

METHOD OF MAKING EVA SHOE MIDSOLE

BACKGROUND OF THE INVENTION

The present invention relates to method of making a shoe midsole, and more particularly to method of making an EVA foamed shoe midsole.

As shown in FIG. 1, the sole of a conventional athletic shoe of prior art is composed of a midsole 10 of wedge shape and an outsole 20. The midsole 10 is generally made of light material having substantial elasticity and toughness so as to afford wearing comfort. The outsole 20 is made of abrasion-resistant plastic material, which serves to prolong the life of shoe. As shown in FIG. 2, the prior art manufacturing process flow of an EVA foamed shoe midsole includes the following steps:

(1) preparing the mixture containing EVA, filling agent, foaming agent, and bridging agent in appropriate proportions;

(2) agitating the mixture thoroughly so as to disperse its constituents evenly;

(3) making piece bodies of predetermined thickness out of the cooled mixture by means of a rolling machine;

(4) shaping the foamed compound into large pieces of thick foamed plates under pressure and heat;

(5) cutting the large thick foamed plates into the midsole material plates 11 of appropriate sizes, as shown in FIG. 3;

(6) cutting a midsole material plate 11 into two wedged material plates 12, each of which is composed of a bevel with a thin side 13 forming the sole portion of the midsole and a thick side 14 forming the heel portion of the midsole, as shown in FIG. 4;

(7) cutting the wedged material plate 12 into a raw midsole blank 15 of a predetermined size, as shown in FIG. 5;

(8) grinding the edge of the raw midsole blank 15 into a flat portion 16 so that a refined midsole blank 17 is formed, as shown in FIG. 6; and (9) placing the refined midsole blank 17 into a molding tool in which a midsole 30 is formed under heat and pressure and is shaped into a final form after being cooled, as shown in FIG. 7.

The shortcomings of the prior art manufacturing process of EVA shoe midsole described above can be summarized as follows:

(1) A substantial amount of raw material is wasted during cutting and grinding processes in steps 5, 7, and 8, as described above.

(2) The substantial amounts of cost and labor are required for disposing properly of the waste materials produced during various stages of the manufacturing process.

(3) The material dust produced during the grinding process of step 8, as described above, is hazardous to the health of workers.

(4) The production rate of shoe midsole is slow in view of its complicated production process flow.

(5) The material and labor costs are relatively high.

SUMMARY OF THE INVENTION

It is therefore the primary objective of the present invention to provide the method of making an EVA foamed shoe midsole with means to improve its effective utilization rate of material so as to reduce the cost of production.

It is another objective of the present invention to provide the method of making an EVA foamed shoe midsole with means to reduce the amount of wastes produced in the process so as to mitigate the problem of disposing of wastes.

It is still another objective of the present invention to provide the method of making an EVA foamed shoe midsole, which eliminates the process of grinding so that no air-polluting powder dust is produced.

It is still another objective of the present invention to provide the method of making an EVA foamed shoe midsole with means to improve the production rate.

It is still another objective of the present invention to provide the method of making an EVA foamed shoe midsole with means to improve the quality of midsole so produced.

BRIEF DESCRIPTION OF THE DRAWINGS

FIG. 5 shows a schematic view of molding the EVA wedged material plate into a raw midsole blank.

FIG. 6 shows a schematic view of the ground edge of an EVA raw midsole blank.

FIG. 7 shows a schematic view of a formed EVA shoe midsole.

DETAILED DESCRIPTION OF THE PREFERRED EMBODIMENTS

Figure 1:
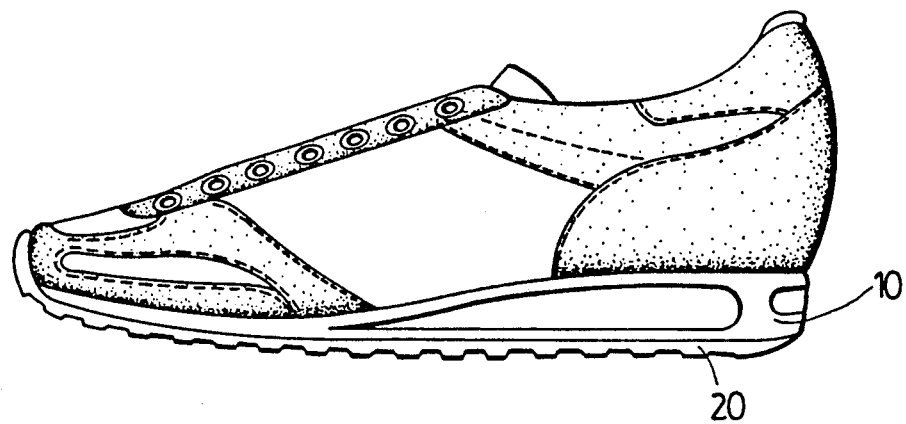
FIG. 1 is a schematic view showing the position of midsole in a conventional shoe of prior art.
Figure 2:
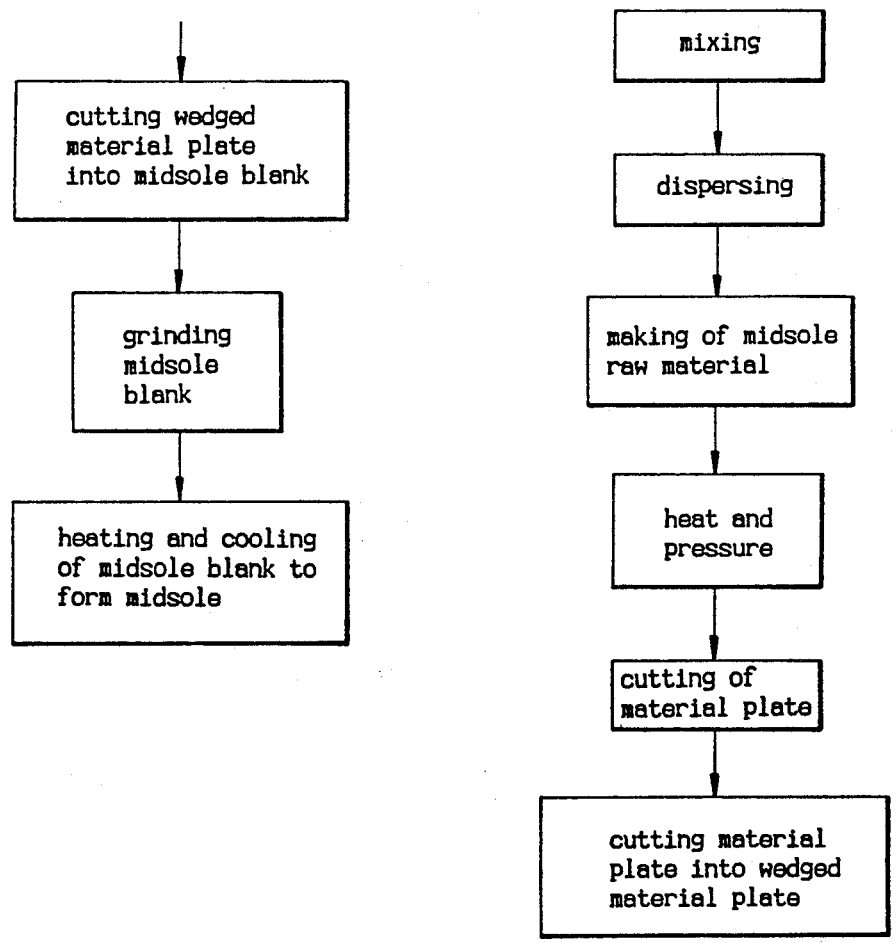
FIG. 2 shows a flow chart of making a shoe midsole of prior art.
Figure 3:
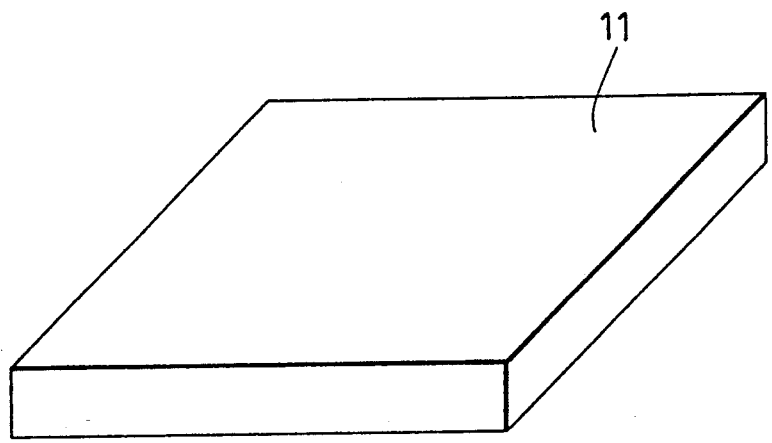
FIG. 3 shows an external view of a cut EVA foamed midsole material plate.
Figure 4:
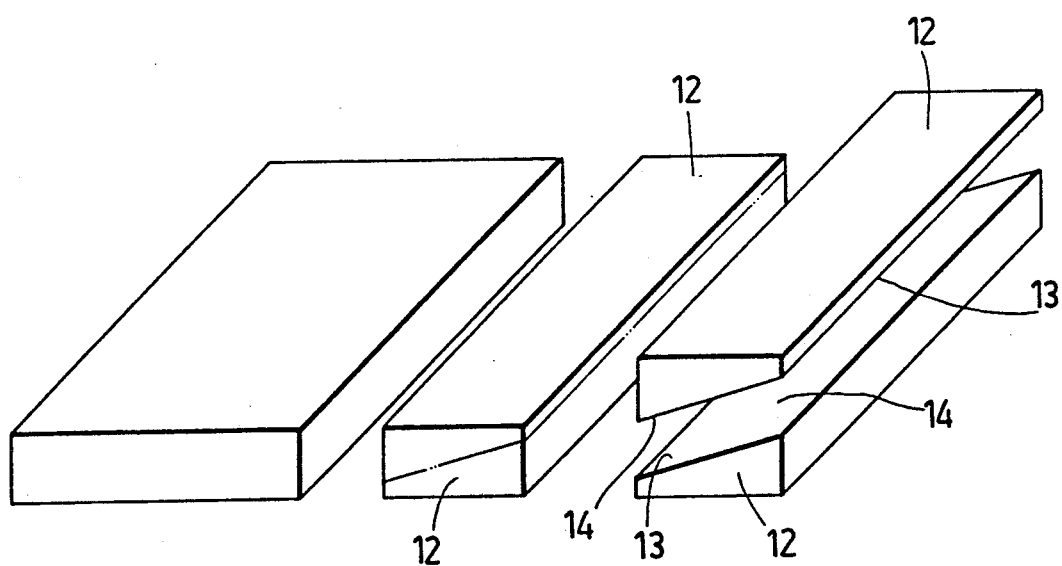
FIG. 4 shows a schematic view of making wedged EVA material plates of shoe midsoles.
Figure 8:
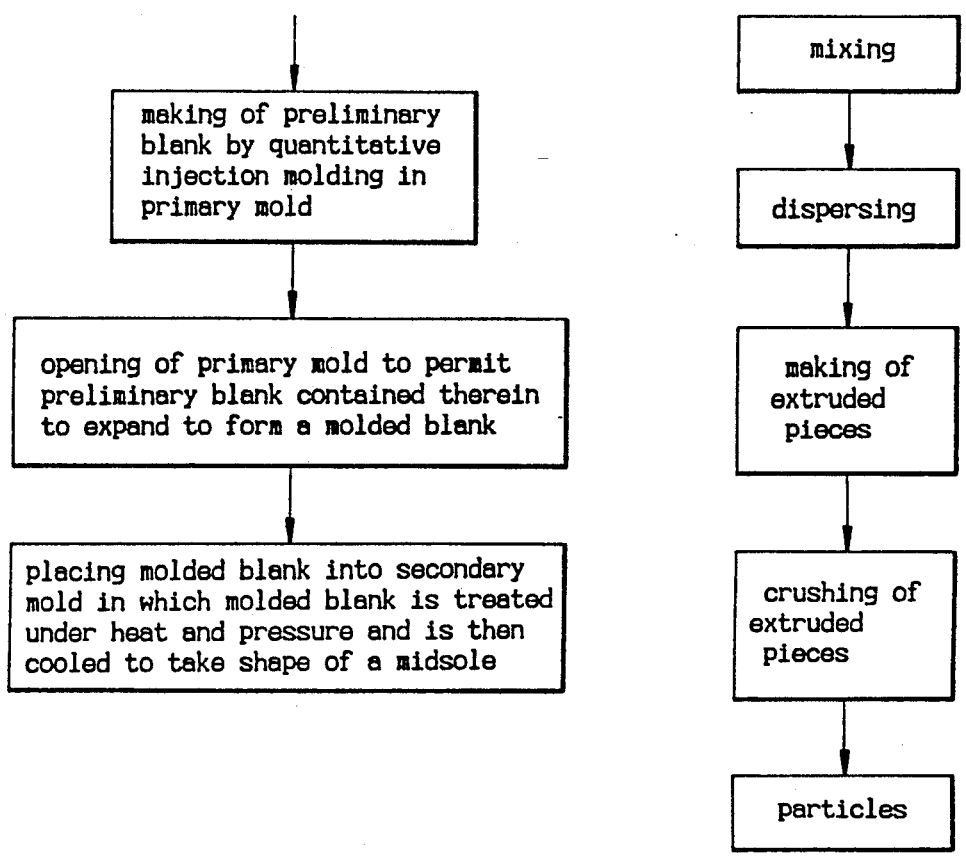
FIG. 8 shows a process flow of the first preferred embodiment of the present invention.

As shown in FIG. 8, the method of making an EVA foamed shoe midsole according to the first preferred embodiment of the present invention includes the following steps:

(1) Ethylene vinyl acetate (EVA), filling agent, foaming agent, bridging agent, finishing aid, foaming aid, and coloring agent are mixed in accordance with the following proportions in terms of percentage by weight: in 100% of ethylene vinyl acetate, add 5-40% of filling agent, 1-10% or preferably 2-6% of foaming agent, 0.5-3% of bridging agent, 0.5-5% of finishing aid, and 0.1-1% of foaming aid and coloring agent; the optimun proportions are as follows: 5-10% for filling agent, 2.9-3.1% for foaming agent, 1.1-1.3% for bridging agent, 1.1-1.5% for finishing aid, 0.4-0.6% for foaming aid, and 0.2-0.6% for coloring agent, with the mixing temperature being in a range of 80-110 degrees in Celsius.

(2) Distribute evenly the constituents of the above mixture by means of a rolling mill.

(3) The above mixture containing the evenly distributed constituents is cooled and is then extruded with a predetermined thickness by means of a rolling mill.

(4) The extruded pieces described in (3) are crushed.

(5) The crushed pieces of (4) are ground into particles.

(6) A preliminary blank 40 is formed by means of quantitative injection molding in a primary mold. The temperature of injection molding is in a range of 80–110 degrees in Celsius. The size of the primary mold is smaller than that of the midsole intended to be made. The primary mold is subjected to a temperature ranging from 140–170 degrees in Celsius, preferably from 150–165 degrees in Celsius. The pressure for injection molding and closing the mold should be in a range of 80–150 kg/cm$^2$, preferably in a range of 100–120 kg/cm$^2$.

Figure 9:
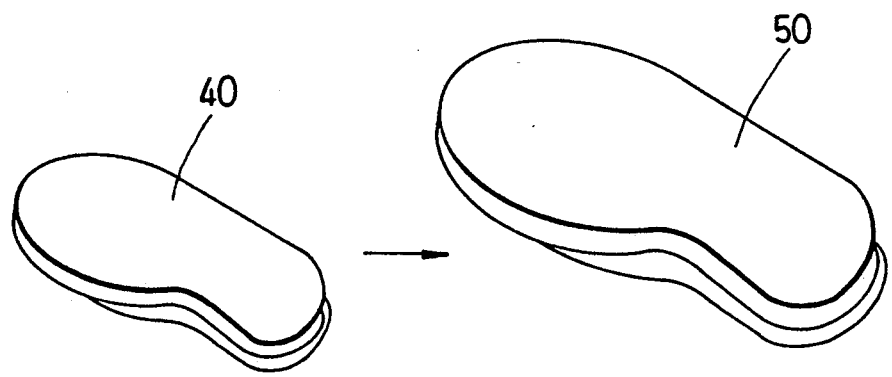
FIG. 9 shows a schematic view of making a primary blank into a final blank according to the first preferred embodiment of the present invention.

(7) The primary mold containing a formed preliminary blank 40 is opened to allow the preliminary blank 40 to expand to become a molded blank 50, as shown in FIG. 9. The time that is required for such process to be brought to a completion is about 5–10 minutes, depending on the volume of the preliminary blank 40.

(8) The warm molded blank 50 is placed into a secondary mold having a shape with a size identical to that of the midsole intended to be made, as shown in FIG. 7. The secondary mold containing the molded blank 50 is then treated under heat and pressure, with heating temperature being in a range of 140–170 degrees in Celsius and the pressure in a range of 50–100 kg/cm$^2$. Thereafter, the secondary mold is cooled, with the cooling temperature in a range of 5–30 degrees in Celsius. The entire process takes about 5–10 minutes, preferably 6 minutes, to complete, with heating time and cooling time each taking up respectively 3 minutes.

It must be added here that the present invention employs a disk-type injection molding machine in order to improve the production efficiency. In the process of injection molding of prior art, as the nozzle of injection molding machine disengages the intake of the mold after completing the injection of the material into the sprinkling duct of the mold, the intake of the mold is open so that the pressure generated during the foaming process of EVA material in the mold causes the injected material to move toward the sprinkling duct where the pressure is lower. As a result, the density of material in the area adjacent to the intake of sprinkling duct is lower. Such lower density of material always results in a lower expansion of the material, which in turn is responsible for the defect of the molded blank 50.

Figure 10:
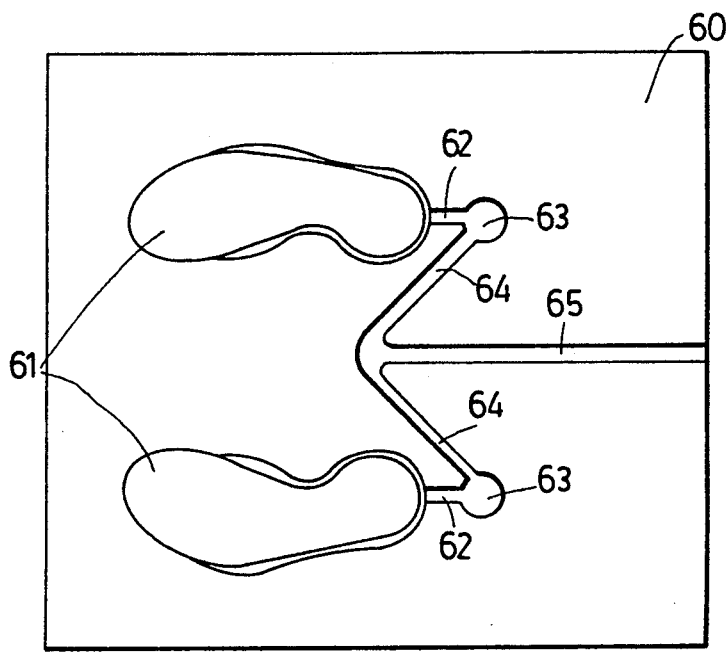
FIG. 10 shows a schematic view of the shape of primary mold of the first preferred embodiment of the present invention.

In order to find a solution to the production problems described above, the present invention makes use of primary mold 60, as shown in FIG. 10, in which there are mold cavities 61 for forming the preliminary blank. Each of these two mold cavities 61 is provided at one end thereof with a branch sprinkling duct 62 in communication with a counter pressure trough 63 connected with a secondary sprinkling duct 64, which communicates with the primary sprinkling duct 65 leading to the intake of the primary mold 60. The sprinkling ducts 65, 64, and 62 are arranged in such a manner that they form acute angles, as shown in FIG. 10. Upon completion of material injection into the primary mold 60, all sprinkling ducts and the counter pressure troughs are full of foam material with counter pressure preventing the EVA material in the mold cavities 61 from flowing back into the branch sprinkling ducts 62.

In addition, the inflation ratio of EVA material can not be controlled with precision. In other words, such control of inflation of EVA material can always result in an error of about 3%. Therefore, the molded blank 50 must be heated in an oven to an extent that it shrinks slightly before it is placed into a secondary mold, in which it is treated under heat and pressure and is subsequently cooled to take form of midsole intended to be made.

Therefore, advantages of the present invention over the prior art have become apparent and are further expounded explicitly as follows:

1. The production of preliminary blanks can be precisely controlled in the injection process, thanks to a unique arrangement of sprinkling ducts and counter pressure troughs in the mold in which a blank is formed.
2. The problem of recovering the waste material is greatly mitigated, because less amount of waste material is produced in the present invention.
3. The flat portion of the midsole blank is made integrally into a unitary body of the blank, thereby eliminating the process of grinding which often generates the dust polluting the air of work shop.
4. In the manufacturing process disclosed in the present invention, material is made into particles, which are injected into the primary mold in which a preliminary blank is formed. Such preliminary blank is then placed into a secondary mold in which it is treated under heat and pressure and is subsequently cooled to take form. Such processes as disclosed by the present invention are relatively simple and precise as compared with the prior art and can be easily automated so as to improve the rate of production.
5. Each of the midsole produced by the method of the present invention is provided with a tough outer membrane, which is formed naturally during the process of making the midsole blank in the mold. Such tough outer membrane is removed during the grinding process of the production method of prior art. As a result, the midsole produced by the present invention is superior in quality.

Figure 11:
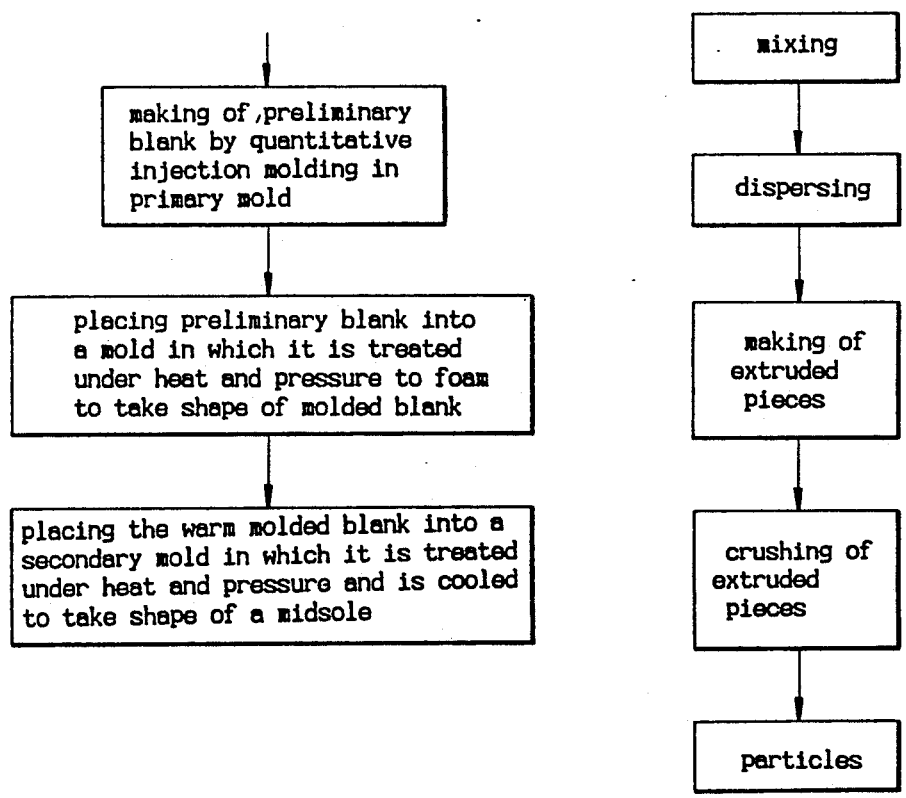
FIG. 11 shows a process flow of the second preferred embodiment of the present invention.

FIG. 11 shows a process flow of the second preferred embodiment of the present invention, which differs from the first preferred embodiment, as described above, in that the preliminary blank formed in step (6) is allowed to foam without heat and pressure, and that the foamed preliminary blank is then placed into a primary mold in which it is treated under heat and pressure in step (7), and further that the blank formed in step (7) is put into a secondary mold in which it is treated under heat and pressure and is subsequently cooled to take shape, as shown in step (8).

The embodiments of the present invention described above are to be considered in all respects as merely illustrations of principles of the present invention. Accordingly, the present invention is to be limited only by the scope of the hereinafter appended claims.

What I claim is:

1. A method of making EVA shoe midsole including a compound containing in percentage by weight the substances such as 100% of ethylene vinyl acetate (EVA) into which 5–40% of filling agent, 1–10% of foaming agent, 0.5–3% of bridging agent, 0.5–5% of finishing aid, 0.1–1% of foaming aid and coloring agent are added under temperature in a range of 80–110 degrees in Celsius, said method being characterized in that:

(a) a preliminary blank is formed in a primary mold by means of a quantitative injection molding under temperature in a range of 80–110 degrees in Celsius, said primary mold having therein mold cavities with size smaller than that of a midsole intended to be made;

(b) said preliminary blank is foamed to form a molded blank under heat and pressure so as to ensure that the size of said molded blank corresponds to that of said midsole, said heat and said pressure being respectively in a range of 140-170 degrees in Celsius and in a range of 80-150 kg/cm$^2$;

(c) said molded blank is treated in a secondary mold under heat and pressure and is subsequently cooled to take form, said secondary mold having mold cavity with size and shape corresponding to the size and the shape of said midsole, said heat and said pressure being respectively in a range of 140-170 degrees in Celsius and in a range of 50-100 kg/cm$^2$, and said molded blank being cooled at the temperature ranging from 5 degrees in Celsius to 30 degrees in Celsius.

2. A method of making EVA shoe midsole according to claim 1, wherein said primary mold is provided with heating apparatus and means to maintain pressure so as to permit the injected molten material to foam to take shape of a blank, said primary mold containing said preliminary blank being subjected to heat treatment for 5 to 10 minutes before being opened to allow said preliminary blank to expand to form said molded blank.

3. A method of making EVA shoe midsole according to claim 1, wherein said primary mold is composed of primary sprinkling duct, secondary sprinkling ducts, and branch sprinkling ducts, which are in communication with said mold cavities.

4. A method of making EVA shoe midsole according to claim 1 or claim 3, wherein said primary mold is composed of at least one counter pressure trough disposed between said primary sprinkling duct and said mold cavities.

5. A method of making EVA shoe midsole according to claim 1, wherein said preliminary blank is made to foam in a mold in which heat and pressure are provided, said mold containing said preliminary blank being treated under said heat and said pressure for 5-10 minutes and opened subsequently to permit said preliminary blank to expand to form said molded blank.

6. A method of making EVA shoe midsole according to claim 1, or claim 2, or claim 5, wherein said molded blank can be baked to shrink so as to have a desired size prior to being placed into said secondary mold.

* * * * *